(12) United States Patent
Matsuo et al.

(10) Patent No.: US 10,241,884 B2
(45) Date of Patent: Mar. 26, 2019

(54) INFORMATION PROCESSING APPARATUS AND METHOD FOR COLLECTING PERFORMANCE DATA

(71) Applicant: FUJITSU LIMITED, Kawasaki-shi, Kanagwa (JP)

(72) Inventors: Miyuki Matsuo, Yokohama (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 26 days.

(21) Appl. No.: 15/409,586

(22) Filed: Jan. 19, 2017

(65) Prior Publication Data

US 2017/0228303 A1  Aug. 10, 2017

(30) Foreign Application Priority Data

Feb. 9, 2016 (JP) ................... 2016-023086

(51) Int. Cl.
*G06F 11/34* (2006.01)
*G06F 11/30* (2006.01)

(52) U.S. Cl.
CPC ...... *G06F 11/3409* (2013.01); *G06F 11/3003* (2013.01)

(58) Field of Classification Search
CPC .. G06F 11/3409; G06F 11/3003; G06F 11/30; G06F 11/34
USPC ........................................................ 714/48
See application file for complete search history.

(56) References Cited

U.S. PATENT DOCUMENTS

| | | | | |
|---|---|---|---|---|
| 7,606,895 B1 * | 10/2009 | Dini | ................. | H04L 12/14 709/223 |
| 8,555,287 B2 * | 10/2013 | Ding | ................. | G06F 9/505 718/102 |
| 2008/0040634 A1 * | 2/2008 | Matsuzaki | .......... | G06F 11/3466 714/47.2 |
| 2008/0162272 A1 * | 7/2008 | Huang | ................. | G06F 11/3409 717/127 |
| 2010/0223598 A1 * | 9/2010 | Levine | ................. | G06F 11/3476 717/128 |
| 2011/0218770 A1 * | 9/2011 | Ii | ................. | G06F 11/30 702/182 |
| 2013/0125103 A1 | 5/2013 | Ddaira | | |
| 2017/0086022 A1 * | 3/2017 | Beattie, Jr. | ............ | H04W 4/023 |

FOREIGN PATENT DOCUMENTS

| | | |
|---|---|---|
| EP | 2390790 | 11/2011 |
| JP | 2011-248895 | 12/2011 |
| JP | 2013-105256 | 5/2013 |

* cited by examiner

*Primary Examiner* — Kamini B Patel
(74) *Attorney, Agent, or Firm* — Fujitsu Patent Center

(57) ABSTRACT

An information processing apparatus includes a memory, and a processor coupled to the memory and configured to obtain performance data of the information processing apparatus at a first time interval repetitively, write the performance data in the memory when a particular value of the performance data indicates a performance decrement of the information processing apparatus, and set a second time interval longer than the first time interval instead of the first time interval for obtaining the performance data when the particular value does not indicate a performance decrement of the information processing apparatus.

8 Claims, 9 Drawing Sheets

FIG. 3

| THRESHOLD VALUE AND DIFFERENT THRESHOLD VALUE | CACHE MISS RATE | RECORDING TIME INTERVAL |
|---|---|---|
| M(=THRESHOLD VALUE) : 15% | EQUAL TO OR HIGHER THAN 15% | 5m s (=FIRST TIME INTERVAL) |
| M1(=DIFFERENT THRESHOLD VALUE) : 10% | EQUAL TO OR HIGHER THAN 10% AND LOWER THAN 15% | 10m s (=SECOND TIME INTERVAL) |
| | LOWER THAN 10% | 15m s (=SECOND TIME INTERVAL) |

FIG. 5

| REMAINING STORAGE CAPACITY OF DATA RECORDING REGION | SECOND TIME INTERVAL |
|---|---|
| SMALLER THAN 25% OF RECORDING REGION STORAGE CAPACITY | 40m s |
| EQUAL TO OR HIGHER THAN 25% AND SMALLER THAN 50% OF RECORDING REGION STORAGE CAPACITY | 30m s |
| EQUAL TO OR HIGHER THAN 50% OF RECORDING REGION STORAGE CAPACITY | 20m s |

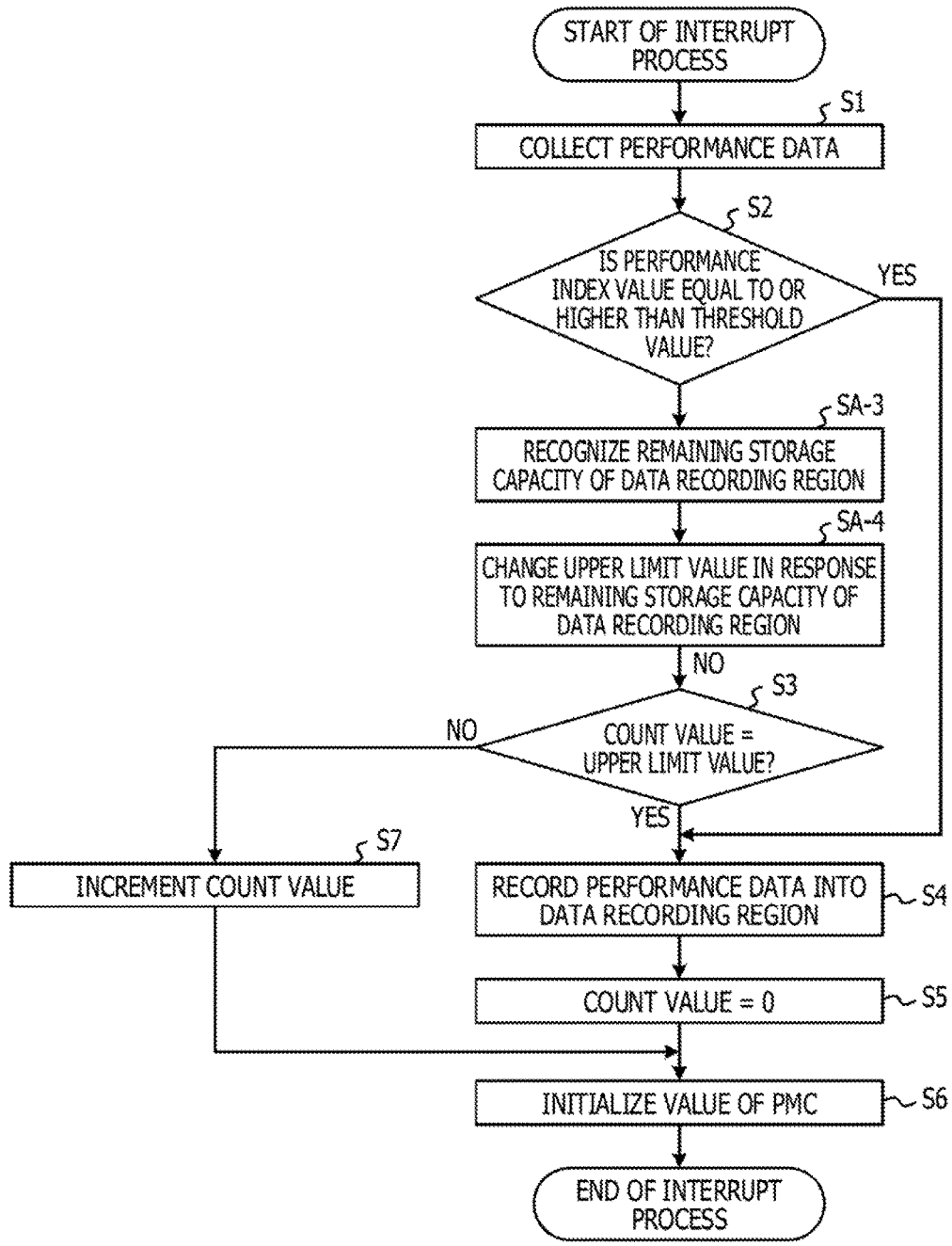

FIG. 7

WHERE PERFORMANCE INDEX VALUE IS LOWER
THAN DIFFERENT THRESHOLD VALUE M1

| REMAINING STORAGE CAPACITY OF DATA RECORDING REGION | SECOND TIME INTERVAL |
|---|---|
| LOWER THAN 25% OF RECORDING REGION STORAGE CAPACITY | 40ms |
| EQUAL TO OR HIGHER THAN 25% AND LOWER THAN 50% OF RECORDING REGION STORAGE CAPACITY | 30ms |
| EQUAL TO OR HIGHER THAN 50% OF RECORDING REGION STORAGE CAPACITY | 20ms |

WHERE PERFORMANCE INDEX VALUE IS EQUAL TO
OR HIGHER THAN DIFFERENT THRESHOLD VALUE M1

| REMAINING STORAGE CAPACITY OF DATA RECORDING REGION | SECOND TIME INTERVAL |
|---|---|
| LOWER THAN 25% OF RECORDING REGION STORAGE CAPACITY | 30ms |
| EQUAL TO OR HIGHER THAN 25% AND LOWER THAN 50% OF RECORDING REGION STORAGE CAPACITY | 20ms |
| EQUAL TO OR HIGHER THAN 50% OF RECORDING REGION STORAGE CAPACITY | 15ms |

INFORMATION PROCESSING APPARATUS AND METHOD FOR COLLECTING PERFORMANCE DATA

CROSS-REFERENCE TO RELATED APPLICATION

This application is based upon and claims the benefit of priority of the prior Japanese Patent Application No. 2016-023086, filed on Feb. 9, 2016, the entire contents of which are incorporated herein by reference.

FIELD

The present embodiment discussed herein is related to an information processing apparatus and a method for collecting performance data.

BACKGROUND

In order to clarify the cause when some performance degradation occurs with a program executed by a processor such as a central processing unit (CPU), a technology for sampling performance data of a CPU is used.

As a related art, a technology has been proposed which profiles a software application and relates to a repetitive compilation process that uses a profiling hook only for a function group of a selected subset (refer, for example, to Japanese Laid-open Patent Publication No. 2011-248895 as Patent Document 1).

Further, a technology for determining a profile target for a sampling type profiler has been proposed. According to this technology, a ratio by which an object having a nature to be utilized for optimization of a program may be calculated. Then, the sampling frequency regarding an allocation place of a class or an object with regard to which the calculated ratio is equal to or lower than a given threshold value may be reduced (refer, for example, to Japanese Laid-open Patent Publication No. 2013-105256 as Patent Document 2).

SUMMARY

According to an aspect of the embodiment, an information processing apparatus includes a memory, and a processor coupled to the memory and configured to obtain performance data of the information processing apparatus at a first time interval repetitively, write the performance data in the memory when a particular value of the performance data indicates a performance decrement of the information processing apparatus, and set a second time interval longer than the first time interval instead of the first time interval for obtaining the performance data when the particular value does not indicate a performance decrement of the information processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a view illustrating an example of a setting of a second time interval in a modification 1;

FIG. 5 is a view illustrating an example of a setting of a second time interval in a modification 2;

FIG. 6 is a flow chart illustrating an example of a flow of a process of the modification 2;

FIG. 7 is a view illustrating an example of a setting of a second time interval in a modification 3;

DESCRIPTION OF EMBODIMENTS

Figure 1:
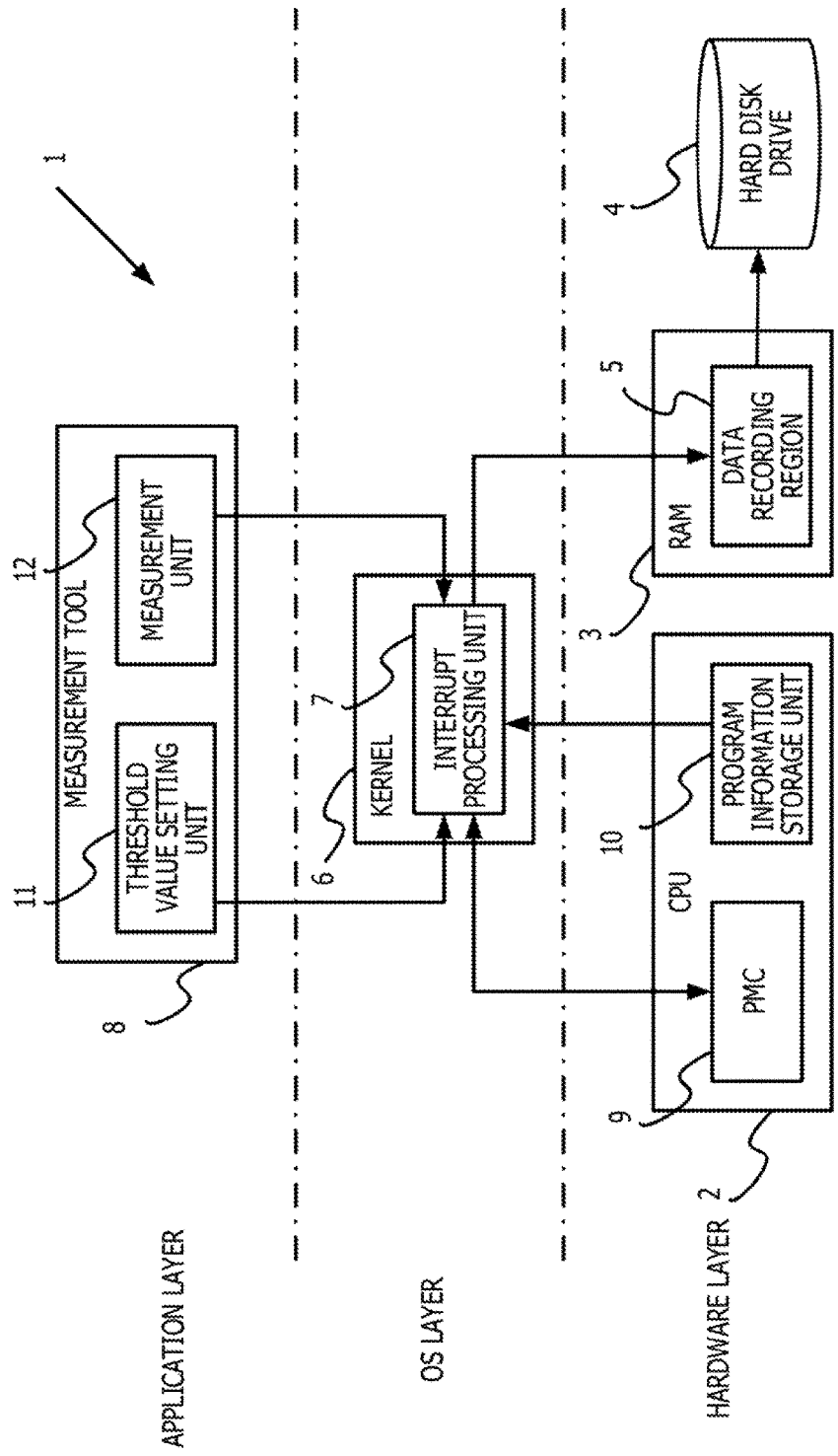
FIG. 1 is a view depicting an example of an information processing apparatus of an embodiment.

Sampled performance data are recorded in a memory. If the time interval after which performance data are sampled becomes long, the detection accuracy of a performance problem is degraded. There is the possibility that the performance problem may not be solved.

If the time interval for sampling of performance data is short, although the detection accuracy of a performance problem increases, the frequency by which performance data are recorded into a recording medium increases. Since the storage capacity of a memory is restricted, if performance data are recorded frequently into the recording medium, the period of time within which performance data may be recorded into the memory becomes short. Therefore, it becomes difficult to perform sampling for a long period of time.

As an aspect of the present embodiment, the present embodiment makes it possible to record performance data efficiently into a memory.

In the following, an embodiment is described. An information processing apparatus includes a CPU. The CPU is an example of a processor. The CPU executes a program for collecting performance data of the embodiment. The information processing apparatus executes a process of the embodiment by execution of the program for collecting performance data by the CPU.

In the embodiment, the information processing apparatus samples performance data relating to operation of the CPU after every fixed period of time. The fixed period of time is a short period of time in which performance data are sampled. In the following description, a time interval of the fixed period of time within which performance data are sampled is also referred to as first time interval.

The information processing apparatus performs sampling of performance data after every first time interval and performs, after every first time interval, decision of whether or not a performance problem occurs in the CPU using a performance index value based on the sampled performance data. The performance index value is an example of a particular value. By such decision, degradation of the detection accuracy of a performance problem is suppressed.

The information processing apparatus stores performance data into a memory. In the embodiment, the information processing apparatus sometimes records performance data after every second time interval, which is longer than the first time interval, into the memory. In this case, the frequency in which performance data are recorded into the memory drops.

Sampling of performance data is performed after every first time interval. Accordingly, when the information processing apparatus records performance data after every second time interval, the performance data are decimated and stored into the memory.

The storage capacity of the memory that stores performance data is restricted. Since the first time interval in which performance data are to be sampled is short, if performance data are recorded into the memory after every first time interval, many performance data are recorded into the memory in a short period of time.

In this case, since the storage capacity of the memory is limited, the number of performance data that may be recorded by the memory is limited. Therefore, if performance data are recorded into the memory after every first time interval, sampling of performance data for a long period of time is difficult.

In the embodiment, from the point of view of the recording load, the information processing apparatus records sampled performance data into a main memory (random access memory (RAM)). The recording load (overhead) when data are recorded is higher when data are recorded into a hard disk drive or the like than when data are recorded into a RAM.

Therefore, in the embodiment, the information processing apparatus records sampled performance data into a RAM. For example, the storage capacity of the RAM is small in comparison with that of a hard disk drive or the like. Accordingly, if sampled performance data are recorded into the RAM after every first time interval, the remaining storage capacity of the RAM is used up in a short period of time.

When the remaining storage capacity of the RAM is used up, or before the remaining storage capacity of the RAM is used up, the performance data stored in the RAM are transferred to the hard disk drive or the like. If the performance data are recorded into the RAM after every first time interval, the frequency in which performance data are recorded into the RAM becomes high, and the remaining storage capacity of the RAM is used up in a short period of time.

In this case, performance data are transferred frequently from the RAM to the hard disk drive or the like. Accordingly, since performance data are transferred frequently from the RAM to the hard disk drive or the like, the recording load becomes high.

Accordingly, it is desirable to reduce the frequency in which performance data are recorded into the RAM having a restricted storage capacity. Then, if the information processing apparatus of the embodiment decides that a performance problem does not occur using a performance index value based on the performance data, the information processing apparatus records performance data into the RAM after every second time interval that is longer than the first time interval.

In this case, the frequency in which performance data are recorded into the memory decreases, and the number of performance data to be recorded into the RAM is decimated. Whereby, sampling of performance data for a long period of time is implemented.

Accordingly, the information processing apparatus of the embodiment suppresses degradation of the detection accuracy of a performance problem because the information processing apparatus performs sampling of performance data after every first time interval and performs the decision of whether or not a performance problem occurs in the CPU after every first time interval.

Further, if the information processing apparatus decides that a performance problem of the CPU does not occur, it records performance data after every second time interval, which is longer than the first time interval, into the memory. Therefore, the frequency in which performance data are recorded into the memory decreases.

Accordingly, the information processing apparatus suppresses degradation of the detection accuracy of a performance problem. Further, if the information processing apparatus decides that a performance problem does not occur in the CPU, it decimates and records the performance data into the memory. Accordingly, performance data may be recorded efficiently into the memory.

It is to be noted that, although, in the embodiment, performance data are recorded into a RAM from the point of view of the recording load, performance data may be recorded into a hard disk drive or the like. This is because, since also the storage capacity of a hard disk drive or the like is restricted, it is desirable that performance data are recorded efficiently into the memory.

The information processing apparatus of the embodiment decides whether or not a performance problem does not occur in the CPU by comparing a performance index value and a threshold value with each other. The performance index value is an example of a particular value based on performance data.

For example, a cache miss rate is sometimes applied to the performance index value. In this case, the information processing apparatus performs comparison between the cache miss rate and a threshold value after every first time interval. When the cache miss rate is equal to or higher than the threshold value, the possibility that a performance problem may occur is high.

In this case, the information processing apparatus decides that a performance problem occurs. If it is decided that a performance problem occurs, the information processing apparatus records performance data into the RAM after every first time interval.

On the other hand, when the cache miss rate is lower than the threshold value, the possibility that a performance problem may not occur is high. In this case, the information processing apparatus decides that a performance problem does not occur. When it is decided that a performance problem does not occur, the information processing apparatus records performance data into the RAM after every second time interval longer than the first time interval.

<Example of Information Processing Apparatus of Embodiment>

In the following, the embodiment is described in detail with reference to the drawings. FIG. 1 depicts an example of an information processing apparatus of an embodiment. As indicated by the example of FIG. 1, an information processing apparatus 1 of the embodiment includes a CPU 2, a RAM 3 and a hard disk drive 4. The CPU 2 executes the program for collecting performance data described hereinabove.

As described hereinabove, performance data relating to operation of the CPU 2 are recorded into a data recording region 5 of the RAM 3. Data other than performance data may be recorded into the RAM 3. The RAM 3 is an example of a memory.

The hard disk drive 4 retains performance data recorded in the data recording region 5 of the RAM 3. For example, when the remaining storage capacity of the data recording region 5 of the RAM 3 is used up or the remaining storage capacity becomes small, the performance data recorded in the data recording region 5 are transferred to the hard disk drive 4.

The CPU 2, RAM 3 and hard disk drive 4 belong to a hardware layer. A kernel 6 is a program that is executed by the CPU 2. The kernel 6 includes an interrupt processing unit 7 that processes an interrupt from the CPU 2. The kernel 6 belongs to an operating system (OS) layer.

A measurement tool 8 issues a given instruction to the interrupt processing unit 7. It is assumed that the measurement tool 8 in the embodiment is an application. The measurement tool 8 belongs to an application layer. For example, in FIG. 1, individual layers are separated from each other using an alternate long and short dash line.

The kernel 6 and the measurement tool 8 are programs executed by the CPU 2. For example, functions of the kernel 6 and the measurement tool 8 are implemented by execution of the programs of the kernel 6 and the measurement tool 8 by the CPU 2.

Accordingly, the main executing body of the functions of the kernel 6 and the measurement tool 8 is the CPU 2, for example, the processor. Further, the function of the interrupt processing unit 7 of the kernel 6 is implemented by execution of the program for collecting performance data described hereinabove by the CPU 2.

The CPU 2 includes a performance monitoring counter (PMC) 9 and a program information storage unit 10. Description is given concerning the PMC 9. The PMC 9 is a function of the CPU 2 for measuring a value relating to a performance of the CPU 2. In the following description, the measurement value measured by the PMC 9 is referred to as PMC measurement value.

The PMC 9 measures events including, for example, an execution instruction number, a cache miss number, a branch instruction miss number and a point of time. The event type to be measured by the PMC 9 is not limited to the examples just mentioned.

For example, the execution instruction number is a number of instructions executed by the CPU 2. The cache miss number is a number of cache hit misses. The branch instruction miss number is a number of times by which a branch prediction is missed.

The PMC 9 includes a register (hereinafter referred to as event set register) for each event, and a condition whether or not an interrupt is to be generated is set to each event set register. It is assumed that, in the embodiment, a setting for generating an interrupt is placed in the event set register for an event corresponding to a point of time (for example, CPU_CYCLE). Further, it is assumed that in the event set registers for events other than the point of time, a setting that an interrupt is not to be generated is placed.

Further, the PMC 9 includes a counter register. The value measured by the PMC 9 is stored into the counter register of the PMC 9. The PMC 9 stores a measurement value of an event type set in an event set register as a PMC measurement value into the counter register.

For example, where a cache miss number is set in the event set register, the PMC 9 counts the cache miss number and stores the counted cache miss number into the counter register of the PMC 9.

Two or more event types may be set in the event set register. For example, if the cache miss number and the execution instruction number are set in the event set register, the PMC 9 counts the cache miss number and the execution instruction number. Then, the PMC 9 stores the counted cache miss number and execution instruction number as PMC measurement value into the counter register of the PMC 9.

In order to generate an interrupt described hereinabove, it is assumed that the event type corresponding to the point of time is set in the event set register of the PMC 9. If an event is generated by a given number in the PMC measurement value corresponding to the point of time, the PMC 9 generates an interrupt to the interrupt processing unit 7 of the kernel 6. It is assumed that, in the embodiment, the PMC 9 is set such that it generates an interrupt after every fixed period of time (first time interval).

Now, the program information is described. The program information stored in the program information storage unit 10 is information relating to a program to be executed by the CPU 2. For example, depending upon a function, a process or the like called by the CPU 2, the use rate of the CPU 2 becomes high and the performance of the CPU 2 degrades, resulting in occurrence of a performance problem.

For example, the program information may be information including instruction addresses and process IDs. ID is an abbreviation of identification. An instruction address is a value of a program counter of the CPU 2. The process ID is an identifier for identifying a process being executed by the CPU 2.

In the embodiment, instruction addresses and process IDs are stored in registers of the program information storage unit 10. Information included in the program information is not limited to the example described above. For example, the program information may include a CPU ID for identifying the CPU.

Now, the measurement tool 8 is described. The measurement tool 8 includes a threshold value setting unit 11 and a measurement unit 12. The threshold value setting unit 11 sets a given threshold value in the interrupt processing unit 7. The threshold value is used for comparison with a performance index value described hereinabove when it is to be decided whether or not a performance problem occurs.

The measurement unit 12 outputs an instruction to start and an instruction to end sampling of performance data to the interrupt processing unit 7. The interrupt processing unit 7 starts sampling of performance data and ends sampling of performance data based on the instructions. Further, the measurement unit 12 outputs various instructions to the interrupt processing unit 7.

Now, details of the interrupt processing unit 7 are described. The interrupt processing unit 7 sets, into the PMC 9, a first time interval that is a time interval after which sampling of performance data is to be performed. The PMC 9 outputs an interruption to the interrupt processing unit 7 after every first time interval.

The measurement unit 12 may instruct the interrupt processing unit 7 of the first time interval. The interrupt processing unit 7 sets the first time interval into the PMC 9 in accordance with the instruction. In the embodiment, it is assumed that the first time interval is "5 milliseconds." The first time interval is not limited to "5 milliseconds."

The interrupt processing unit 7 collects (samples) performance data from the CPU 2 in accordance with an interruption inputted thereto after every first time interval from the PMC 9. In the embodiment, the performance data include a PMC measurement value and program information.

Accordingly, the interrupt processing unit 7 collects a PMC measurement value from the PMC 9 and collects program information from the program information storage unit 10 in accordance with an interruption inputted thereto after every first time interval from the PMC 9. Consequently, the interrupt processing unit 7 samples performance data after every first time interval.

The interrupt processing unit 7 compares, after every first time interval, a performance index value based on a collected PMC measurement value and a threshold value set by the threshold value setting unit 11 with each other. The performance index value may be a PMC measurement value or may be a value obtained by performance of a given arithmetic operation for a PMC measurement value by the interrupt processing unit 7.

The performance index value is a value relating to a performance of the CPU 2. If the performance index value is favorable, it is considered that the performance of the CPU 2 is favorable. If the performance index value is not favorable, it is considered that the performance of the CPU 2 is also not favorable. The performance index value is a value based on performance data including a PMC measurement value.

In the embodiment, the measurement unit 12 designates a performance index value to be used to the interrupt processing unit 7. For example, the performance index value may be a cache miss number.

In this case, the interrupt processing unit 7 sets the event type of the cache miss number into the event set register of the PMC 9. Based on the setting, the interrupt processing unit 7 collects a cache miss number from the PMC 9 after every first time interval.

The threshold value setting unit 11 sets a cache miss number, which makes a criterion for decision of whether or not a performance problem occurs within the first time interval, into the interrupt processing unit 7 as a threshold value.

The threshold value set into the interrupt processing unit 7 by the threshold value setting unit 11 may be set in advance by the user of the information processing apparatus 1. The threshold value may also be an average value of a cache miss number measured by a plural number of times while a performance problem does not occur in the CPU 2.

The interrupt processing unit 7 compares the cache miss number collected from the PMC 9 with the threshold value. When the cache miss number is equal to or higher than the threshold value, the interrupt processing unit 7 decides that the cache miss number satisfies a particular condition. In this case, the interrupt processing unit 7 decides that a performance problem occurs.

On the other hand, when the cache miss number is smaller than the threshold value, the interrupt processing unit 7 decides that the cache miss number does not satisfy the particular condition. In this case, the interrupt processing unit 7 decides that a performance problem does not occur.

When the cache miss number is equal to or higher than the threshold value, the interrupt processing unit 7 records performance data into the data recording region 5 after every first time interval. On the other hand, when the cache miss number is smaller than the threshold value, the interrupt processing unit 7 records performance data into the data recording region 5 after every second time interval that is longer than the first time interval.

It is assumed that, in the embodiment, the second time interval is "15 milliseconds." The second time interval is not limited to "15 milliseconds." The second time interval may be such a time interval in which, when the interrupt processing unit 7 decimates and records performance data into the data recording region 5, an outline of the performance of the CPU 2 is known. Further, the second time interval may be set into the interrupt processing unit 7 in accordance with an instruction of the measurement unit 12.

The performance index value may be a cache miss rate. In this case, the interrupt processing unit 7 performs setting of a cache miss rate as an event type to be collected by the interrupt processing unit 7 into the event set register for a cache miss number and an execution instruction number in the PMC 9.

The interrupt processing unit 7 collects a cache miss number and an execution instruction number from the PMC 9 after every first time interval in accordance with an interruption from the PMC 9. The threshold value setting unit 11 sets, into the interrupt processing unit 7, a cache miss rate, which makes a criterion for decision of whether or not a performance problem occurs within the first time interval, as the threshold value.

The interrupt processing unit 7 divides the cache miss number collected from the PMC 9 by the execution instruction number to calculate a cache miss rate (=cache miss number/execution instruction number). The threshold value setting unit 11 sets, into the interrupt processing unit 7, the cache miss rate, which makes a criterion for decision of whether or not a performance problem occurs within the first time interval, as the threshold value.

The interrupt processing unit 7 compares the arithmetically operated cache miss rate with the threshold value. If the cache miss rate is equal to or higher than the threshold value, the cache miss rate satisfies the particular condition. In this case, the interrupt processing unit 7 decides that a performance problem occurs. On the other hand, when the cache miss rate is lower than the threshold value, the cache miss rate does not satisfy the particular condition. In this case, the interrupt processing unit 7 decides that a performance problem does not occur.

When the cache miss rate is equal to or higher than the threshold value, the interrupt processing unit 7 records performance data into the data recording region 5 after every first time interval. On the other hand, when the cache miss rate is lower than the threshold value, the interrupt processing unit 7 records performance data into the data recording region 5 after every second time interval that is longer than the first time interval.

Accordingly, the performance index value sometimes is a PMC measurement value and sometimes is a value obtained by calculation performed for a PMC measurement value by the interrupt processing unit 7. For example, the performance index value may be a branch instruction miss rate, instructions per clock cycle (IPC), clock cycles per instruction (CPI) or the like.

The IPC is a value obtained by dividing the execution instruction number by the clock cycle number. The CPI is a value obtained by dividing the clock cycle number by the execution instruction number. Accordingly, the CPI is a reciprocal of the IPC.

For example, where the performance index value is a cache miss rate, a cache miss number or the like, the performance index value indicates that, as it increases, the performance of the CPU 2 becomes less favorable, and as the performance index value decreases, the performance of the CPU 2 becomes more favorable.

In this case, when the performance index value is equal to or higher than the threshold value, the interrupt processing unit 7 decides that a performance problem occurs, when the performance index value is lower than the threshold value, the interrupt processing unit 7 decides that a performance problem does not occur.

As described hereinabove, the interrupt processing unit 7 samples performance data in accordance with an interruption from the PMC 9 inputted after every first time interval. In the embodiment, the interrupt processing unit 7 collects a PMC measurement value and program information after every first time interval.

The interrupt processing unit 7 performs collection of program information, for example, in the following manner. The kernel 6 has a function of collecting program information by executing various functions. The interrupt processing unit 7 may collect program information by executing the various functions of the kernel 6.

For example, the interrupt processing unit 7 refers to a register (for example, pt_regs->ip) in which an execution address is recorded. The interrupt processing unit 7 thereby collects an instruction address from the program information storage unit 10.

Further, the interrupt processing unit 7 refers to a variable for referring to information of a process being executed by the CPU 2 (for example, current->pid). The interrupt processing unit 7 thereby collects a process ID from the program information storage unit 10.

Further, the program information may include time information. The time information is collected, for example, by execution of a function (for example, get_cycles) for returning a value of a time stamp counter.

The method of collecting program information from the program information storage unit 10 by the interrupt processing unit 7 is not limited to the example described above.

As described hereinabove, the interrupt processing unit 7 collects performance data in accordance with an interruption from the PMC 9 inputted after every first time interval and compares the performance index value and the threshold value therefor with each other. Then, the interrupt processing unit 7 decides based on a result of the comparison whether or not the performance index value satisfies a particular condition thereby to decide whether or not a problem occurs in the performance of the CPU 2.

If the interrupt processing unit 7 decides based on a result of the comparison between the performance index value and the threshold value that the performance problem occurs, the interrupt processing unit 7 records the performance data into the data recording region 5 after every first time interval having a short time interval.

On the other hand, if the interrupt processing unit 7 decides based on a result of the comparison between the performance index value and the threshold value that the performance problem does not occur, the interrupt processing unit 7 records the performance data into the data recording region 5 after every second time interval that is longer than the first time interval.

Consequently, the frequency in which the interrupt processing unit 7 records performance data into the data recording region 5 decreases. As a result, the performance data recorded into the data recording region 5 are decimated in number, this makes it possible to perform sampling of performance data for a long period of time.

For example, where the first time interval is "5 milliseconds" and the second time interval is "15 milliseconds," the interrupt processing unit 7 samples performance data and performs comparison between a performance index value and the threshold value after every "5 milliseconds" that is the first time interval. Therefore, degradation of the detection accuracy of a performance problem is suppressed.

Further, if the interrupt processing unit 7 decides based on a result of the comparison between the performance index value and the threshold value that a performance problem does not occur, the interrupt processing unit 7 records performance data into the data recording region 5 after every time interval of "15 milliseconds" that is the second time interval. Therefore, the frequency in which performance data are recorded into the data recording region 5 decreases.

In this case, the interrupt processing unit 7 decimates performance data for two operation cycles from among collected performance data for three operation cycles and records the performance data for the remaining one operation cycle into the data recording region 5. While the performance index value remains lower than the threshold value, the interrupt processing unit 7 decimates performance data and records the remaining performance data into the data recording region 5.

Accordingly, in the embodiment, since the frequency in which performance data are recorded into the data recording region 5 of the RAM 3 decreases while degradation of the detection accuracy of a performance problem is suppressed, the interrupt processing unit 7 may record performance data efficiently into the data recording region 5 having a limited storage capacity.

Flow Chart of Embodiment

Now, an example of a flow of processing of the embodiment is described with reference to a flow chart of FIG. 2. It is assumed that the measurement unit 12 sets the first time interval to "5 milliseconds" and sets the second time interval to "15 milliseconds" in the interrupt processing unit 7.

Further, it is assumed that the measurement unit 12 sets the performance index value to be used by the interrupt processing unit 7 to the cache miss rate. Therefore, the interrupt processing unit 7 sets the cache miss number and the execution instruction number to the event type of the event set register of the PMC 9. Further, the interrupt processing unit 7 sets the point of time to the event type of the event set register of the PMC 9.

Further, it is assumed that the threshold value setting unit 11 sets the threshold value for the comparison of the cache miss rate to "15%" in the interrupt processing unit 7.

Figure 2:
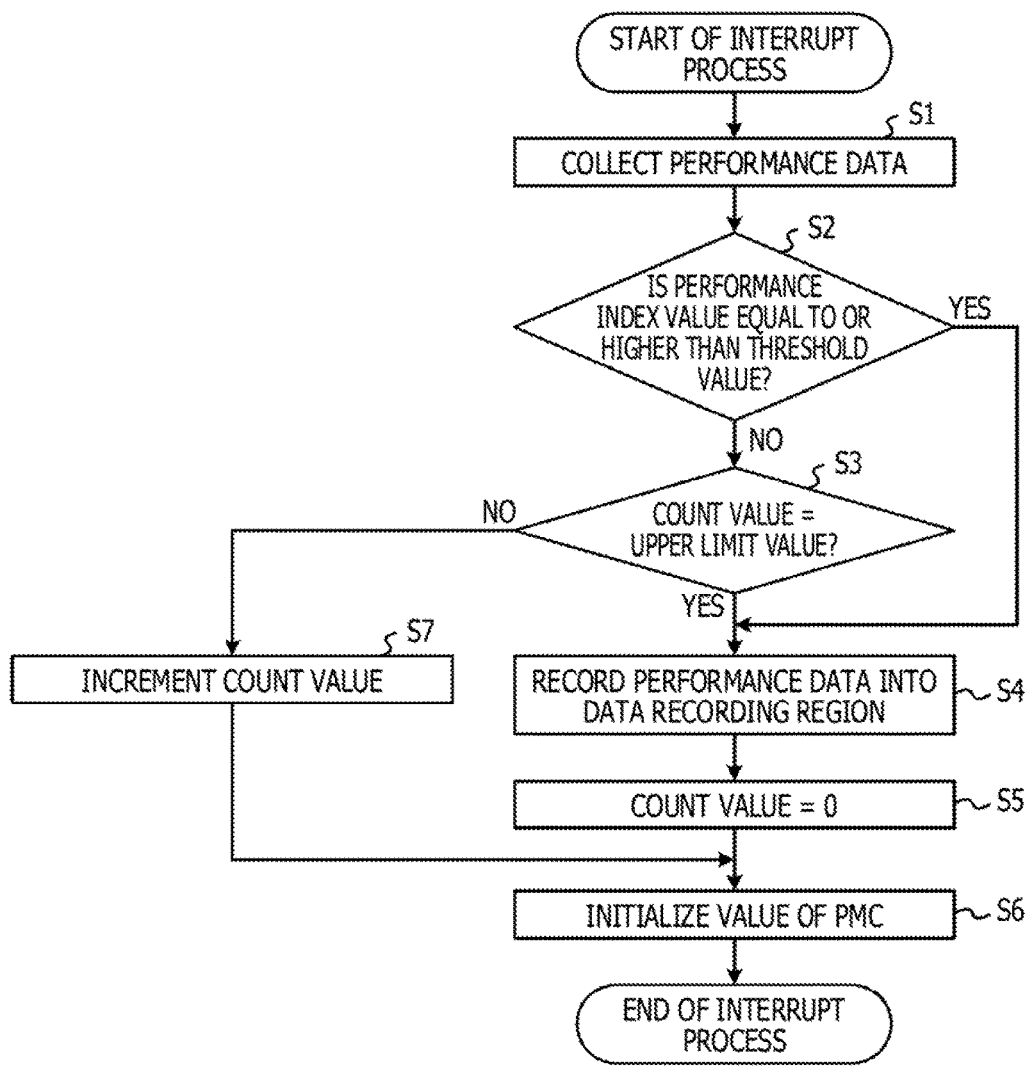
FIG. 2 is a flow chart illustrating an example of a flow of a process of the embodiment.

In the example of FIG. 2, the interrupt processing unit 7 uses a count value in order to decide whether or not the second time interval has elapsed. The initial value of the count value is zero, and the interrupt processing unit 7 increments the count value every time an interruption is inputted from the PMC 9. The interrupt processing unit 7 decides that the second time interval has elapsed when the count value reaches an upper limit value.

The upper limit value is a value indicative of the second time interval and is given as a value obtained by dividing the second time interval by the first time interval. Since the first time interval is "5 milliseconds" and the second time interval is "15 milliseconds," the upper limit value is "3."

As described hereinabove, the PMC 9 outputs an interruption to the interrupt processing unit 7 every time the first time interval, namely, "5 milliseconds," elapses. The interrupt processing unit 7 starts an interrupt process in response to the inputted interruption.

The interrupt processing unit 7 collects performance data from the CPU 2 in response to the interruption from the PMC 9 (step S1). Consequently, sampling of performance data is performed. In the embodiment, the performance data include a PMC measurement value and program information.

As described hereinabove, a cache miss number and an execution instruction number are set in the event type of the event set register of the PMC 9. Therefore, when an interruption is inputted from the PMC 9, the interrupt processing unit 7 collects the cache miss number and the execution instruction number as a PMC measurement value from the counter register of the PMC 9.

The interrupt processing unit 7 divides the collected cache miss number by the execution instruction number to calculate a cache miss rate. This cache miss rate is used as the performance index value. It is to be noted that, where the performance index value is, for example, the cache miss number, the PMC measurement value becomes the performance index value.

The interrupt processing unit 7 collects the program information stored in the program information storage unit 10. The interrupt processing unit 7 decides whether or not the performance index value is equal to or higher than a threshold value therefor (step S2).

When the performance index value is lower than the threshold value (NO at step S2), the interrupt processing unit 7 decides whether or not the count value reaches its upper limit value (step S3). If the interrupt processing unit 7 decides at step S2 that the performance index value is equal to or higher than the threshold value (YES at step S2), the interrupt processing unit 7 decides that a performance problem occurs.

For example, if the cache miss rate is "20%," this cache miss rate is higher than the threshold value "15%." In this case, the interrupt processing unit 7 records the performance data into the data recording region 5 (step S4).

If the performance index value is equal to or higher than the threshold value, since the interrupt processing unit 7 records the performance data after every first time interval, the performance data are recorded into the data recording region 5 without being decimated. Then, the interrupt processing unit 7 sets the count value to zero (step S5).

The count value defines a timing at which next performance data are to be recorded after the second time interval (15 milliseconds) after performance data are recorded in a preceding operation cycle. Therefore, after the interrupt processing unit 7 records performance data into the data recording region 5, the interrupt processing unit 7 sets the count value to zero.

The interrupt processing unit 7 initializes the value of the PMC (step S6). As described hereinabove, the PMC 9 measures the cache miss number, execution instruction number and point of time within a period of time of "5 milliseconds" that is the first time interval.

Accordingly, in order to count the cache miss number and the execution instruction number within a period of time until the PMC 9 generates an interruption subsequently, the interrupt processing unit 7 performs initialization to clear the cache miss number and the execution instruction number stored in the counter register of the PMC 9 to zero.

Further, in order to cause the PMC 9 to generate an interruption after the first time interval elapses, the interrupt processing unit 7 sets "5 milliseconds," which is the first time interval, into the counter register that corresponds to the point of time of the PMC 9. Accordingly, by setting an initial value to the PMC measurement value, initialization of the PMC measurement value is performed.

When the performance index value is lower than the threshold value (NO at step S2) and the count value does not reach the upper limit value (NO at step S3), the interrupt processing unit 7 records performance data into the data recording region 5 after every second time interval. In this case, the performance data are decimated and recorded into the data recording region 5.

In this case, the interrupt processing unit 7 increments the count value without recording performance data into the data recording region 5 (step S7). Then, the interrupt processing unit 7 initializes the value of the PMC and ends the interrupt process.

The process of the flow chart of FIG. 2 is performed every time the interrupt processing unit 7 receives an interruption from the PMC 9 as an input thereto. The PMC 9 outputs an interruption after every first time interval. Every time an interruption is inputted, the interrupt processing unit 7 performs comparison between the performance index value and the threshold value. If the performance index value is equal to or higher than the threshold value, the interrupt processing unit 7 records the performance data into the data recording region 5.

On the other hand, as long as the performance index value remains a value lower than the threshold value, the decision at step S2 remains NO. Then, if the count value does not reach the upper limit value, the decision at step S3 is NO. In this case, the count value is incremented.

Then, if the performance index value is lower than the threshold value (NO at step S2) and the count value reaches the upper limit value (YES at step S3), the interrupt processing unit 7 stores the performance data into the data recording region 5.

In short, after the period of time of the second time interval (15 milliseconds) elapses after performance data are recorded into the data recording region 5 in a preceding operation cycle, the interrupt processing unit 7 records the performance data into the data recording region 5. Then, the interrupt processing unit 7 performs the processes at steps S5 and S6 and ends the interrupt process.

For example, even if the count value does not reach the upper limit value, when the interrupt processing unit 7 decides that the performance index value is equal to or higher than the threshold value (YES at step S2), at the point of time, the interrupt processing unit 7 records the performance data into the data recording region 5.

The process of the flow chart of FIG. 2 is a process where the cache miss rate is used as the performance index value. The cache miss rate indicates that, as the value thereof decreases, the performance of the CPU 2 becomes more favorable. For example, the IPC indicates that, as the value thereof increases, the performance of the CPU 2 becomes more favorable, as the value thereof decreases, the performance of the CPU 2 becomes less favorable.

In this case, the interrupt processing unit 7 performs the each process of the flow chart of FIG. 2 using the CPI, which is a reciprocal of the IPC, as the performance index value. However, the interrupt processing unit 7 may use the IPC as the performance index value. In this case, at step S2 of FIG. 2, a decision of "is performance index value equal to or lower than threshold value?" is made.

<Modification 1>

Now, a modification 1 is described. The modification 1 is an example in a case in which the interrupt processing unit 7 changes the second time interval, which is longer than the first time interval, to a plurality of stages. The threshold value setting unit 11 sets one or a plurality of different threshold values other than the threshold values described hereinabove into the interrupt processing unit 7. The threshold value and the different threshold values are values determined in advance.

FIG. 3 illustrates an example of a setting of a second time interval in a modification 1. For example, FIG. 3 depicts an example of a threshold value M and a different threshold value M1 set in the interrupt processing unit 7 by the threshold value setting unit 11 when a cache miss rate is used as a performance index value. As indicated by the example of FIG. 3, the threshold value M and the different threshold value M1 are threshold values for comparing a cache miss rate.

A recording time interval is a time interval within which the interrupt processing unit 7 records performance data into the data recording region 5. The recording time interval may be the first time interval or may be the second time interval. Further, the second time interval changes to a plurality of stages.

As described hereinabove, the threshold value setting unit 11 sets "15%" as the threshold value M for comparing a cache miss rate. The interrupt processing unit 7 arithmetically operates a cache miss rate based on a cache miss number and an instruction execution number as a PMC measurement value collected from the PMC 9. When the cache miss rate is equal to or higher than the threshold value M (=15%), the interrupt processing unit 7 records performance data into the data recording region 5 after every first time interval.

On the other hand, when the cache miss rate is lower than the threshold value M, the interrupt processing unit 7 compares the different threshold value M1 and the cache miss rate with each other and changes the second time interval to two stages in response to a result of the comparison. In the example of FIG. 3, the threshold value setting unit 11 sets the different threshold value M1 to "10%."

For example, where the cache miss rate as the performance index value is "3%," since the cache miss rate is low, it is supposed that the performance of the CPU 2 is favorable. In this case, since the cache miss rate is lower than the different threshold value M1, the interrupt processing unit 7 sets the second time interval to "15 milliseconds."

For example, where the cache miss rate as the performance index value is "14%," this cache miss rate is lower than the threshold value M. Therefore, the interrupt processing unit 7 decides that no performance problem occurs and records performance data after every second time interval.

For example, although the cache miss rate is lower than the threshold value M, it has a value proximate to the threshold value M. Therefore, it is supposed that the performance of the CPU 2 is not favorable. In this case, the interrupt processing unit 7 compares the cache miss rate with the different threshold value M1. Since the cache miss rate is equal to or higher than the different threshold value M1, the interrupt processing unit 7 sets the second time interval to "10 milliseconds."

Accordingly, when the performance index value is lower than the threshold value M, the interrupt processing unit 7 compares the performance index value with the different threshold value M1 and changes the second time interval in response to a result of the comparison. However, if the performance index value becomes equal to or higher than the threshold value M, at this point of time, the interrupt processing unit 7 records performance data after the first time interval into the data recording region 5.

When the performance index value is lower than the threshold value M, the interrupt processing unit 7 records performance data into the data recording region 5 after every second time interval. Consequently, the frequency in which performance data are recorded into the data recording region 5 decreases.

However, even if the performance index value is lower than the threshold value M, if the performance index value is proximate to the threshold value M, it is supposed that the performance of the CPU 2 is not favorable. Therefore, preferably the second time interval after which performance data are to be recorded is set short.

On the other hand, if the performance index value is not proximate to the threshold value M, since it is supposed that the performance of the CPU 2 is favorable, preferably the second time interval after which performance data are to be recorded is set long. This increases the number of performance data to be decimated by the interrupt processing unit 7.

Accordingly, when the performance index value is lower than the threshold value M, the interrupt processing unit 7 may adjust the second time interval in response to the performance index value by changing the second time interval to a plurality of stages in response to a result of the comparison between the performance index value and the different threshold value M1.

While, in the example of FIG. 3, the number of different threshold values is one, the number of different threshold values may be a plural number. By setting the different threshold value to a plurality of stages, the second time interval may be adjusted more finely. The setting example of the different threshold value and the second time interval is not limited to the example of FIG. 3.

Where the interrupt processing unit 7 uses a performance index value that indicates that, as the value decreases, the performance of the CPU 2 becomes more favorable like the cache miss rate, the threshold value setting unit 11 sets one or a plurality of different threshold values lower than the threshold value M.

On the other hand, where the interrupt processing unit 7 uses a performance index value that indicates that, as the value increases, the performance of the CPU 2 becomes more favorable like the IPC, the threshold value setting unit 11 sets one or a plurality of different threshold values higher than the threshold value M.

Figure 4:
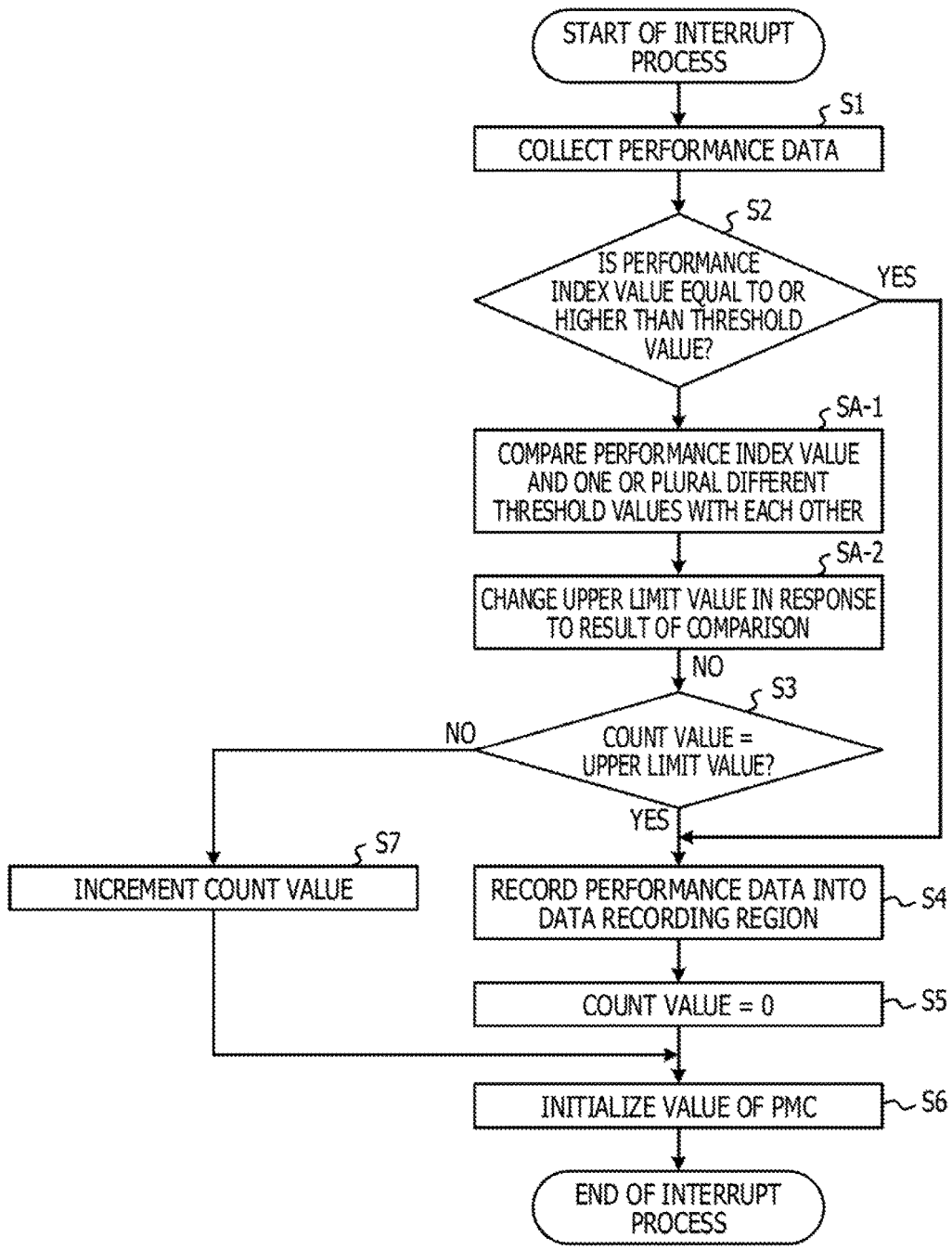
FIG. 4 is a flow chart illustrating an example of a flow of a process of the modification 1.

FIG. 4 depicts an example of a flow chart of the modification 1. The flow chart of FIG. 4 includes step SA-1 and step SA-2 in addition to the steps of the flow chart of FIG. 2. The other steps of FIG. 4 are same as those in FIG. 2.

As depicted in the example of FIG. 4, when the performance index value is lower than the threshold value (NO at step S2), the interrupt processing unit 7 compares the performance index value and one or a plurality of different threshold values with each other (step SA-1). Then, the interrupt processing unit 7 changes the upper limit value in response to a result of the comparison (step SA-2).

For example, in the example of FIG. 3, if the cache miss rate that is the performance index value is "14%," the interrupt processing unit 7 sets the second time interval to "10 milliseconds." Since the first time interval is "5 milliseconds," the upper limit value is given as a value obtained by dividing "10 milliseconds" by "5 milliseconds" (=2).

For example, in the example of FIG. 3, if the cache miss rate that is the performance index value is "3%," the interrupt processing unit 7 sets the second time interval to "15 milliseconds." Since the first time interval is "5 milliseconds," the upper limit value is given as a value obtained by dividing "15 milliseconds" by "5 milliseconds" (=3).

Therefore, the interrupt processing unit 7 changes the upper limit value in response to a result of the comparison between the cache miss rate and the different threshold value M1. If the cache miss rate is equal to or higher than the different threshold value M1 (=10%), since the upper limit value is "2," the interrupt processing unit 7 decimates and records performance data within one operation cycle from performance data within two operation cycles into the data recording region 5.

When the cache miss rate is lower than the different threshold value M1 (=10%), since the upper limit value is "3," the interrupt processing unit 7 decimates and records performance data within two operation cycles from performance data within three operation cycles into the data recording region 5.

In the process of the flow chart of FIG. 4, the interrupt processing unit 7 decides based on the count value whether or not the second time interval has elapsed. However, the interrupt processing unit 7 may decide based on a point of time whether or not the second time interval has elapsed.

Further, the example of FIG. 4 illustrates an example where the cache miss rate is applied to the performance index value. For example, if the IPC is applied to the performance index value, the substance at step S2 of FIG. 6 changes to "is performance index value equal to or lower than threshold value?"

<Modification 2>

Now, a modification 2 is described. The modification 2 is an example in which the second time interval is changed to a plurality of stages in response to the remaining storage capacity of the data recording region 5. For example, when the remaining storage capacity of the data recording region 5 is small and no performance problem occurs, it is preferable that the frequency in which the interrupt processing unit 7 records performance data into the data recording region 5 is low.

For example, a case is supposed in which the performance index value is a cache miss rate. The interrupt processing unit 7 may set the second time interval longer in the case where the cache miss rate is lower than the threshold value and the remaining storage capacity of the data recording region 5 is small.

Consequently, the number of times by which performance data to be recorded into the data recording region 5 are decimated increases and the frequency in which the interrupt processing unit 7 records performance data into the data recording region 5 decreases.

For example, the interrupt processing unit 7 monitors and recognizes the remaining storage capacity of the data recording region 5. Then, when an interruption is inputted from the PMC 9, the interrupt processing unit 7 changes the second time interval in response to the recognized remaining storage capacity. FIG. 5 illustrates an example of a setting of a second time interval in a modification 2. For example, FIG. 5 depicts an example when the second time interval is changed to three stages in response to the remaining storage capacity of the data recording region 5.

In the example of FIG. 5, if the interrupt processing unit 7 recognizes that the remaining storage capacity of the data recording region 5 is smaller than 25%, it sets the second time interval to "40 milliseconds." On the other hand, when the interrupt processing unit 7 recognizes that the remaining storage capacity of the data recording region 5 is equal to or higher than 25% and is smaller than 50%, it sets the second time interval to "30 milliseconds."

On the other hand, if the interrupt processing unit 7 recognizes that the remaining storage capacity of the data recording region is equal to or higher than 50%, it sets the second time interval to "20 milliseconds." Accordingly, the interrupt processing unit 7 changes the second time interval in response to the remaining storage capacity of the data recording region 5.

In all of the examples of the second time interval of three stages of the example of FIG. 5, the second time interval is set when the cache miss rate is lower than the threshold value. When the cache miss rate is equal to or higher than the threshold value, the interrupt processing unit 7 records performance data into the data recording region 5 after every first time interval "5 milliseconds" instead of after every second time interval.

In the example of FIG. 5, when the cache miss rate is lower than the threshold value, the interrupt processing unit 7 sets the second time interval so as to become long as the remaining storage capacity of the data recording region 5 decreases.

For example, when the remaining storage capacity of the data recording region 5 is equal to or higher than 50%, the interrupt processing unit 7 sets the second time interval to "20 milliseconds." Since the second time interval is a time interval longer than the first time interval, the frequency in which performance data are recorded into the data recording region 5 decreases.

On the other hand, when the remaining storage capacity of the data recording region 5 is smaller than 25%, the remaining storage capacity of the data recording region 5 is small. In this case, if the cache miss rate is lower than the threshold value, the interrupt processing unit 7 makes the second time interval longer than that where the remaining storage capacity of the data recording region 5 is equal to or higher than 50%.

Consequently, since the frequency in which the interrupt processing unit 7 records performance data into the data recording region 5 further decreases, performance data may be recorded efficiently into the data recording region 5 that has a reduced data storage capacity.

FIG. 6 depicts an example of a flow chart of the modification 2. The flow chart of FIG. 6 includes step SA-3 and step SA-4 in addition to the steps of the flow chart of FIG. 2. The other steps of FIG. 6 are same as those in FIG. 2.

As depicted in the example of FIG. 6, when the performance index value is lower than the threshold value (NO at step S2), the interrupt processing unit 7 recognizes the remaining storage capacity of the data recording region 5 (step SA-3). Then, the interrupt processing unit 7 changes the upper limit value in response to the remaining storage capacity of the data recording region 5 (step SA-4).

For example, in the example of FIG. 5, when the remaining storage capacity of the data recording region 5 is equal to or higher than 50%, the interrupt processing unit 7 sets the second time interval to "20 milliseconds." Since the first time interval is "5 milliseconds," the upper limit value is given as a value obtained by dividing "20 milliseconds" by "5 milliseconds" (=4).

Further, in the example of FIG. 5, if the remaining storage capacity of the data recording region 5 is equal to or higher than 25% and is smaller than 50%, the interrupt processing unit 7 sets the second time interval to "30 milliseconds." Since the first time interval is "5 milliseconds," the upper limit value is given as a value obtained by dividing "30 milliseconds" by "5 milliseconds" (=6).

Further, in the example of FIG. 5, if the remaining storage capacity of the data recording region 5 is smaller than 25%, the interrupt processing unit 7 sets the second time interval to "40 milliseconds." Since the first time interval is "5 milliseconds," the upper limit value is given as a value obtained by dividing "40 milliseconds" by "5 milliseconds" (=8).

In the process of the flow chart of FIG. 6, the interrupt processing unit 7 decides based on the count value whether or not the second time interval has elapsed. However, the interrupt processing unit 7 may decide based on the point of time whether or not the second time interval has elapsed.

Further, the example of FIG. 6 indicates an example of a case in which the cache miss rate is applied to the performance index value. For example, if the IPC is applied to the performance index value, the substance at step S2 of FIG. 6 changes to "is performance index value equal to or lower than threshold value?"

<Modification 3>

A modification 3 is an example that is a combination of the modification 1 and the modification 2. In the modification 3, the cache miss rate is applied as the performance index value. However, the performance index value is not limited to the cache miss rate.

In the modification 3, the interrupt processing unit 7 changes the second time interval in response to the remaining storage capacity of the data recording region 5 similarly as in the modification 2. However, in the modification 3, the second time interval set in response to the remaining storage capacity of the data recording region 5 differs depending upon a result of comparison between a performance index value and one or a plurality of different threshold values.

FIG. 7 illustrates an example of a setting of a second time interval in a modification 3. For example, in an example of FIG. 7, the second time interval set in response to a remaining storage capacity of the data recording region 5 differs between a case where the cache miss rate is lower than the different threshold value M1 and a case where the cache miss rate is equal to or higher than the different threshold value M1.

The example of the setting of the second time interval is not limited to the example of FIG. 7. It is supposed that, where the cache miss rate is lower than the different threshold value M1, the performance of the CPU 2 is favorable.

Even if the cache miss rate is equal to or higher than the different threshold value M1, if the cache miss rate is lower than the threshold value M, the interrupt processing unit 7 decides that a performance problem does not occur in the CPU 2. However, in this case, it is supposed that the performance of the CPU 2 may not be favorable.

Then, the interrupt processing unit 7 sets the second time interval to a different set value in response to the remaining storage capacity of the data recording region 5 depending upon whether or not the cache miss rate is lower than the different threshold value M1.

The interrupt processing unit 7 sets the second time interval, which corresponds to the remaining storage capacity of the data recording region 5 when the cache miss rate is equal to or higher than the different threshold value M1, shorter than the second time interval that corresponds to the remaining storage capacity of the data recording region 5 when the cache miss rate is lower than the different threshold value M1.

For example, in the example of FIG. 7, when the remaining storage capacity of the data recording region 5 is lower than 25%, if the cache miss rate is lower than the different threshold value M1, the interrupt processing unit 7 sets the second time interval to "40 milliseconds." On the other hand, when the remaining storage capacity of the data recording region 5 is lower than 25%, if the cache miss rate is equal to or higher than the different threshold value M1, the interrupt processing unit 7 sets the second time interval to "30 milliseconds."

Accordingly, the interrupt processing unit 7 may record performance data efficiently into the data recording region 5 in response to the performance of the CPU 2 and the remaining storage capacity of the data recording region 5 by making the second time interval corresponding to the remaining storage capacity of the data recording region 5 different depending upon the performance index value.

Similarly as in the modification 1 and the modification 2 described hereinabove, when the performance index value is equal to or higher than the threshold value M, the interrupt processing unit 7 in the modification 3 records performance data into the data recording region 5 after every first time interval instead of after every second time interval.

Figure 8:
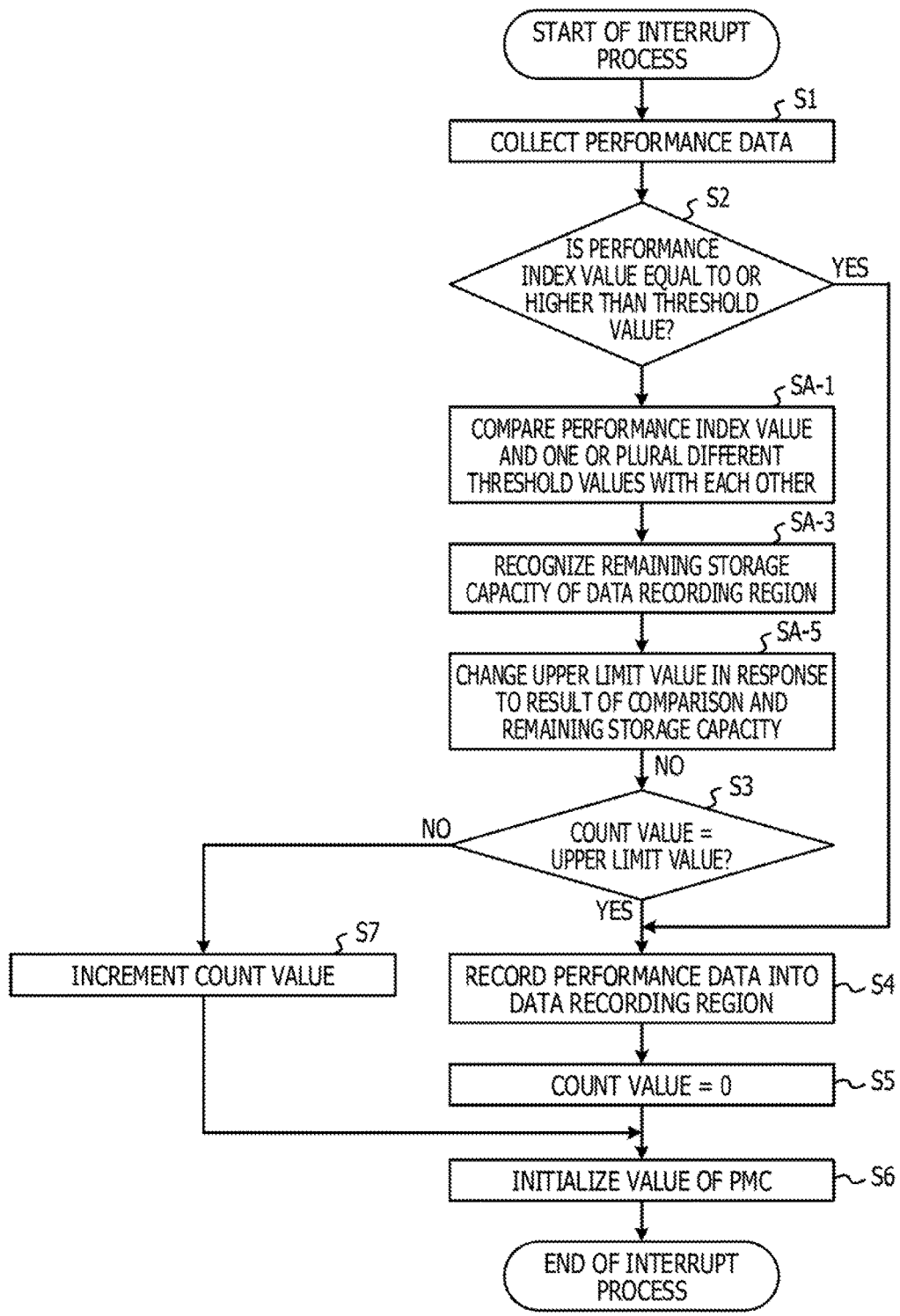
FIG. 8 is a flow chart illustrating an example of a flow of a process of the modification 3.

FIG. 8 depicts an example of a flow chart of the modification 3. The flow chart of FIG. 8 includes steps SA-3 and SA-5 in addition to the steps of the flow chart of FIG. 4. The other steps of FIG. 8 are same as those in FIG. 4.

As indicated by the example of FIG. 8, when the performance index value is lower than the threshold value (NO at step S2), the interrupt processing unit 7 compares the performance index value and one or a plurality of different threshold values with each other (step SA-1). Further, the interrupt processing unit 7 recognizes the remaining storage capacity of the data recording region 5 (step SA-3). The process at step SA-3 is same as that at step SA-3 of the flow chart of FIG. 6.

Then, the interrupt processing unit 7 changes the upper limit value in response to a result of the comparison at step SA-1 and the remaining storage capacity of the data recording region 5 recognized at step SA-3 (step SA-5).

In the process of the flow chart of FIG. 8, the interrupt processing unit 7 decides based on the count value whether or not the second time interval has elapsed. However, the interrupt processing unit 7 may decide based on the point of time whether or not the second time interval has elapsed.

Further, the example of FIG. 8 indicates an example of a case in which the cache miss rate is applied to the performance index value. For example, where the IPC is applied to the performance index value, the substance at step S2 of FIG. 8 changes to "is performance index value equal to or lower than threshold value?"

<Example of Hardware Configuration of Information Processing Apparatus>

Figure 9:
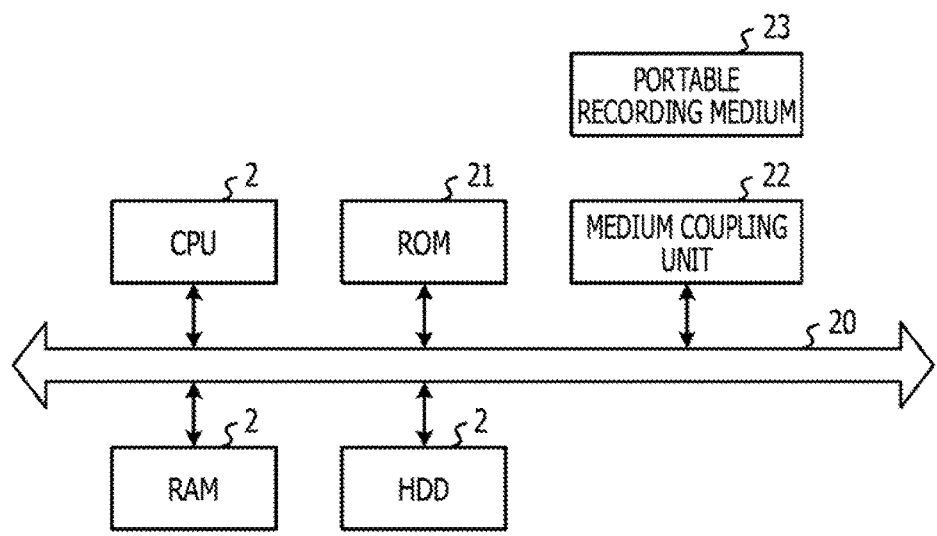
FIG. 9 is a view depicting an example of a hardware configuration of an information processing apparatus.

Now, an example of a hardware configuration of an information processing apparatus is described with reference to FIG. 9. Incidentally, the information processing apparatus may be the information processing apparatus 1 depicted in FIG. 1. As depicted in FIG. 9, a CPU 2, a RAM 3, a hard disk drive 4, a read only memory (ROM) 21 and a medium coupling unit 22 are coupled to a bus 20. For example, in FIG. 9, the hard disk drive is denoted in abbreviation as "HDD."

The ROM 21 is a nonvolatile memory that stores a program to be deployed to the RAM 3. The medium coupling unit 22 is provided for coupling to a portable recording medium 23. As the portable recording medium 23, a portable memory, an optical disk (such as a compact disc (CD) or a digital versatile disc (DVD)), a semiconductor memory and so forth may be applied. A program for performing the processes of the embodiment may be recorded in the portable recording medium 23.

Each of the RAM 3, the hard disk drive 4, the ROM 21 and the portable recording medium 23 is an example of a computer-readable tangible storage medium. Such tangible storage media are not temporary media such as a signal carrier.

The present technology is not limited to such an embodiment as described above, may assume various configurations or embodiments without departing from the spirit and scope of the present technology.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a memory; and
   a processor coupled to the memory and configured to:
      obtain performance data of the information processing apparatus at a first time interval repetitively,
      store the performance data in the memory when a particular value of the performance data indicates a performance decrement of the information processing apparatus,
      determine whether a count value reaches a certain value which corresponds to a second time interval which is longer than the first time interval, when the particular value does not indicate a performance decrement of the information processing apparatus, the count value indicating a storage interval for the performance data,
      store the performance data into the memory when it is determined that the count value indicates the second time interval, and
      increment the count value when it is determined that the count value does not indicate the second time interval.

2. The information processing apparatus according to claim 1, wherein
   the particular value is a cache miss value of the information processing apparatus, and
   the processor is configured to determine that the performance data indicates the performance decrement when the cache miss value is equal to or higher than a threshold value.

3. The information processing apparatus according to claim 1, wherein, when the performance data are to be stored in the memory at a second time interval repetitively, the processor changes the second time interval in response to a remaining storage capacity of the memory.

4. A method of collecting performance data executed by an information processing apparatus including a memory and a processor coupled to the memory, the method comprising:
   obtaining performance data of the information processing apparatus at a first time interval repetitively;
   storing the performance data in the memory when a particular value of the performance data indicates a performance decrement of the information processing apparatus;
   determining whether a count value reaches a certain value which corresponds to a second time interval which is longer than the first time interval, when the particular value does not indicate a performance decrement of the information processing apparatus, the count value indicating a storage interval for the performance data;
   storing the performance data into the memory when it is determined that the count value indicates the second time interval; and
   incrementing the count value when it is determined that the count value does not indicate the second time interval.

5. The method according to claim 4, further comprising determining whether the particular value of the performance data indicates the performance decrement of the information processing apparatus.

6. The method according to claim 4, wherein
   the particular value is a cache miss value of the information processing apparatus, and
   the determining whether the particular value indicates the performance decrement includes determining whether the cache miss value is equal to or higher than a threshold value.

7. The information processing apparatus according to claim 1, wherein the processor is configured to set the count value to zero after the performance data is stored in the memory.

8. The information processing apparatus according to claim 1, wherein
   the certain value is an upper limit of the count value, and
   the upper limit is obtained by dividing the second time interval by the first time interval.

* * * * *